United States Patent [19]
Khrapunovich et al.

[11] Patent Number: 5,845,063
[45] Date of Patent: Dec. 1, 1998

[54] SIGNAL STATUS PROPAGATION IN A DISTRIBUTED CONTROL SYSTEM

[75] Inventors: Gregory Khrapunovich, Mayfield Hts.; Marty Gulaian, Cleveland Heights; Thomas J. Scheib, Chesterland, all of Ohio

[73] Assignee: Elsag International N.V., Amsterdam, Netherlands

[21] Appl. No.: 712,495

[22] Filed: Sep. 11, 1996

[51] Int. Cl.⁶ ............................... G06F 3/00; G06F 15/16
[52] U.S. Cl. ...................... 395/183.13; 395/822; 395/843
[58] Field of Search ............................. 395/183.13, 843, 395/822; 364/184, 181, 178, 131, 140, 141

[56] References Cited

U.S. PATENT DOCUMENTS

| | | | |
|---|---|---|---|
| 4,124,889 | 11/1978 | Kaufman et al. | 395/822 |
| 4,313,160 | 1/1982 | Kaufman et al. | 395/843 |
| 4,542,479 | 9/1985 | Kamimura et al. | 364/184 |
| 4,819,149 | 4/1989 | Sanik et al. | 364/132 |

OTHER PUBLICATIONS

InterOperable Systems Project Fieldbus Specification Function Block Application Process —Part 1 and Part 2—ISP Foundation (1993).

FOUNDATION™ Specification Function Block Application Process—Part 1—Fieldbus Foundation 1994–1996.

*Primary Examiner*—Ly Hua
*Attorney, Agent, or Firm*—Michael M. Rickin

[57] ABSTRACT

A distributed control system wherein status is propagated through the system along with the signal with which the status is associated. The function blocks of the system include rules for propagation of the status through the system. The system may also include function blocks for testing the propagated status to determine if the same is bad and function blocks to force the propagated status to have a certain status. The rules may be customized by the user, for example, to block status propagation through a function block.

6 Claims, 1 Drawing Sheet

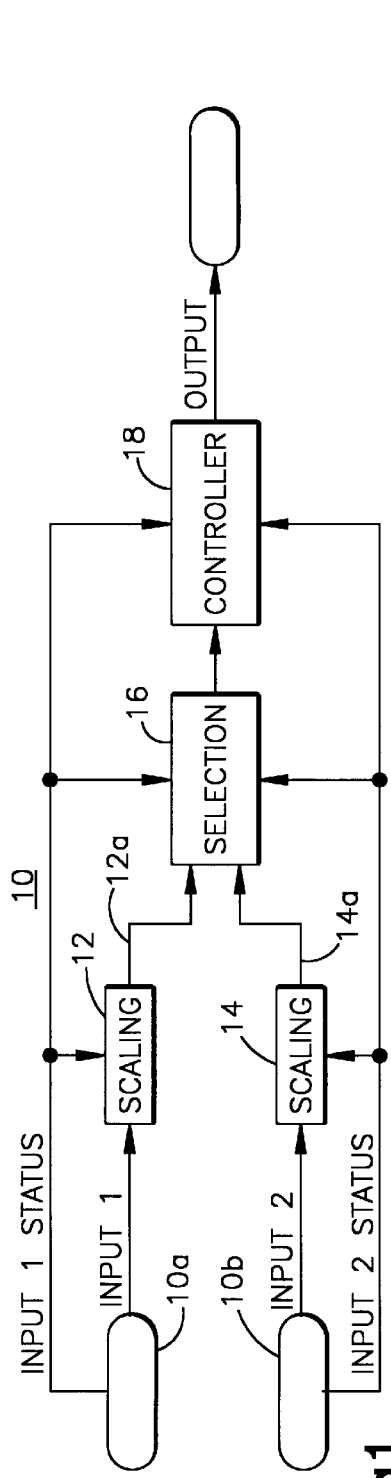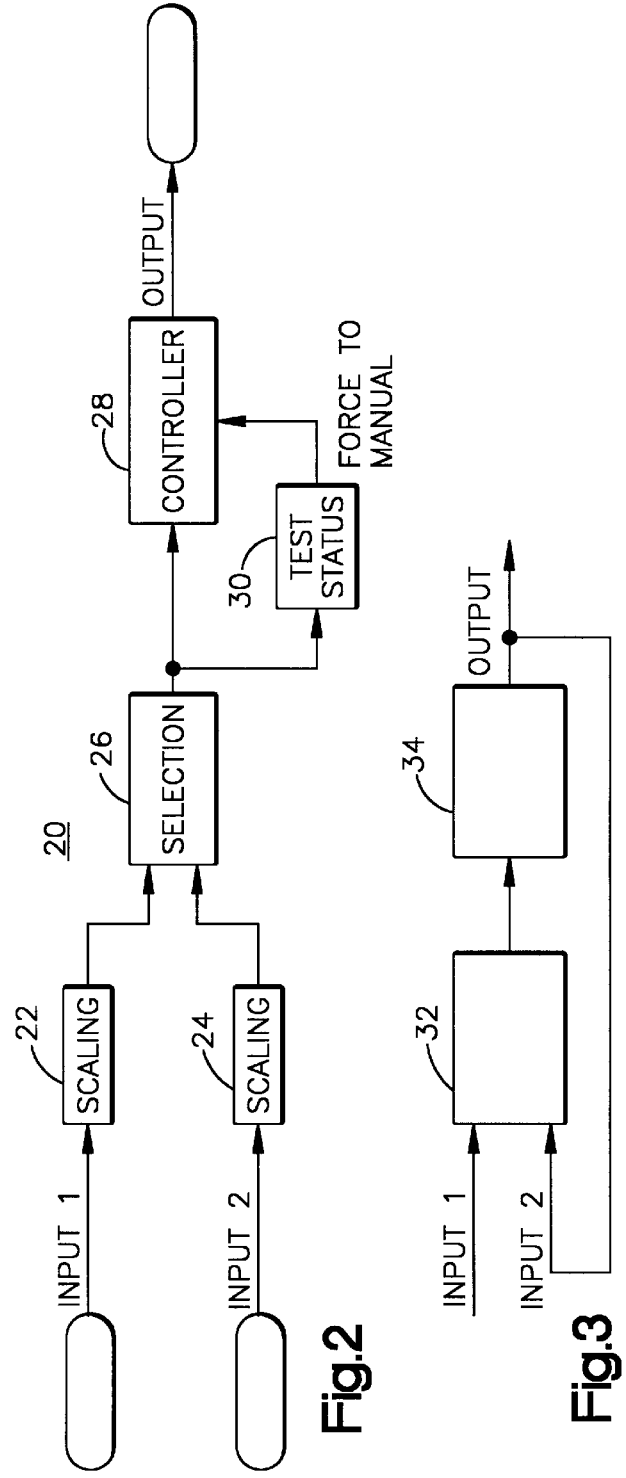

SIGNAL STATUS PROPAGATION IN A DISTRIBUTED CONTROL SYSTEM

FIELD OF THE INVENTION

This invention relates to the propagation of signals in a distributed control system and more particularly to the status of those signals and the propagation of that status in the system.

DESCRIPTION OF THE PRIOR ART

A typical distributed process control system defines specific control philosophy using programmable function blocks which exchange signals. The function blocks implement basic system functions such as a controller, filter, math, Boolean logic, signal transfer, etc. The function blocks receive input signals and produce output signals.

In a distributed system, the signals may become invalid or suspect. The invalid or suspect signal is said to have bad status. For example, a field transmitter which may be providing to the system a signal indicative of temperature or pressure may go off-line. Therefore, the signal from the transmitter will have a bad status.

It is imperative that the control system detect the bad status at any point where the signal with that status can be used. The simplified prior art distributed control system 10 shown in FIG. 1 illustrates the problem. System 10 has first and second inputs 10a, 10b. The signals present at inputs 10a, 10b are designated as input 1 and input 2. Associated with input 1 is its status designated as input 1 status and associated with input 2 is its status designated as input 2 status.

System 10 also includes scaling blocks 12 and 14 which are responsive to the input 1 and input 2 signals. The outputs 12a and 14a of blocks 12 and 14 are connected to selection block 16 whose output is connected to controller block 18. As is shown in FIG. 1, the input 1 status and input 2 status are also connected to blocks 12, 14, 16 and 18 so that these blocks can take appropriate action if either or both of the input status should become bad.

The system 10 and therefore the connection of the input status to each of the blocks in system 10 appears in FIG. 1 to be quite simple. This would be so if the blocks are implemented in only one module. A typical distributed process control system may, however, include, hundreds of hardware and software modules. The number of input/output (I/O) tags in such a system may range from several hundreds to as high as tens of thousands. Thus, the complexity of linking the input status to the blocks increases dramatically in the typical prior art distributed system used for process control.

As can be appreciated, the more complex an activity the more likely the performing of the activity will lead to errors. Further, the use of input status in a large number of blocks in the typical prior art distributed process control system will require a substantial effort on the part of the personnel configuring the system to ensure that the status which appears at a block is correctly associated with the signal appearing at that block. This effort will be in the form of manual labor as the checking of the correct association of the status cannot easily be performed by automation tools. In addition, the number of signals travelling in the system may double because status is a separate signal. Therefore, the complexity in using the input status in prior art distributed process control systems may be the reason that status is not used to its full potential in such systems.

A 1993 publication of the InterOperable Systems Project ("ISP") Foundation entitled "Fieldbus Specification. Function Block Application Process—Part 1" describes function blocks which receive values, that is signals, with status and produce values with status. The ISP publication does not, however, list any rules for status propagation. The status of the block outputs is determined by the block algorithm depending mainly on the block mode and output type. The ISP publication does not discuss direct status propagation from input to output even when the value does propagate through the block. Further the ISP publication does not mention combining two or more input statuses into one output status.

A publication of the Fieldbus Foundation entitled "Foundation Specification. Function Block Application Process", Document FF-890, describes a list of thirteen status propagation rules which should be embedded in a limited and predefined set of function blocks. The Fieldbus Foundation publication also describes the enumeration of status values from good to bad. The Fieldbus Foundation publication, however, does not describe the testing of status or the forcing of status to have a certain value.

SUMMARY OF THE INVENTION

A distributed control signal that has at least two sampled data signals each having an included status that each have a predetermined number of bits. The system also has at least one function block responsive to the two signals. The block has one or rules therein providing for propagation of the at least two included statuses in accordance with a bitwise OR of some of the predetermined number of bits of each of the included statuses.

A distributed control signal that has at least two sampled data signals each having an included status that each have a predetermined range of values representing status from good to bad. The system also has at least one function block responsive to the two signals. The block has one or rules therein providing for propagation of the at least two included statuses in accordance with selecting the worst of the range of values from the included statuses for status propagation through the block.

DESCRIPTION OF THE DRAWING

FIG. 1 shows a shows a block diagram of a simplified prior art distributed control system.

FIG. 2 shows a block diagram of a simplified distributed control system wherein status is propagated in accordance with the present invention.

FIG. 3 shows a block diagram of an application that may lead to the latching of bad status.

DESCRIPTION OF THE PREFERRED EMBODIMENT(S)

Referring now to FIG. 2, there is shown a block diagram of a system 20 which is identical to the system 10 of FIG. 1 except that the input status 1 and input status 2 are included as part of the input 1 and input 2 signals, respectively and propagate throughout system 20 with those signals. Because of the inclusion of the status with the signal, system 20 does not include a separate link of the status for each of the input signals to the blocks 22, 24, 26 and 28. These blocks are identical in function to the blocks 12, 14, 16 and 18 of FIG. 1. Therefore, in system 20 the status associated with each input signal propagates through the scaling blocks 22 and 24 and selection block 26 to controller block 28.

In one embodiment of the present invention, the status is a 32 bit word wherein the bits have the following meaning:

| Bit | Name | Meaning |
| --- | --- | --- |
| 1 | FirstOut | Indicates that a status bit was newly set by this block after detecting a problem. Does not propagate from block to block. |
| 2 | HardErr | Hardware error detected, typically set by blocks handling I/O. |
| 3 | SoftErr | Software error or an illegal math operation was detected. The setting of this bit is initiated in the function block itself. |
| 4 | ComErr | Communication error between blocks in a distributed system. |
| 5 | Subst | Substituted value, normal signal value has been overridden. Does not necessarily imply bad status. |
| 6 | Test | Set when a function block is in debug mode. Does not necessarily imply bad status |
| 7 | Startup | Set when a function block is in a startup mode. Does not necessarily imply bad status. |
| 8–16 | | Reserved for future use. |
| 17–32 | User 1 . . . User 16 | User assignable bits and user can redefine the names. |

As can be appreciated, the propagation of the input signal and its status through scaling blocks 12, 14 would not present a problem if the scaling blocks provide the function of multiplying the signal plus status at its input by a constant. In that instance, the status of the input signal appears at the output of the block. A problem would, however, arise if the scaling block provides the function of multiplying the signal plus status at its input by another signal which also has a status. The signal at the output of the scaling block must in accordance with the present invention have a status included with it and the question that must be answered is how is that status determined.

The propagation of the scaled input 1 signal plus its status and the scaled input 2 signal plus its status through the selection block 26 does present a problem as that block uses a third input or selection signal (not shown in FIG. 2) which also includes status, to select which of the two scaled input signals appears at the output of the block. The signal at the output of the selection block must in accordance with the present invention have a status included with it and the question that must be answered is how is that status determined.

In order to answer the questions described above, the present invention has rules associated with the propagation of the status through the function blocks to ensure that the proper status always appears at the output of a block. The rules for propagation of the status with the signal in the present embodiment are as follows:

1. Function blocks will propagate status to the outputs by taking a bitwise OR of the statuses of the inputs used in the calculations. The FirstOut bit (bit 1) does not propagate.
2. For function blocks where the output value is calculated from previous inputs as well as current inputs, only the current input status will propagate to the output. These types of blocks include low-pass filters, integrators, PID controllers and others.
3. Input signals which are used as conditions for internal "if" or "switch" statements will not propagate their status to the outputs.
4. Status may be blocked at any function block input. This is part of configuring the system.
5. Function blocks do not react to the status. A Test Status block which will be described below reacts to the status. Referring Referring once again to FIG. 2, the above rules will now be applied to the selection block 26. As was described above, the block 26 chooses between the two inputs based on a third selector input (not shown in FIG. 2). According to the third rule, the status of the selector input will not propagate to the output of the block. Only the selected input will propagate status to the output.

The main use of signal status is to take action when the signal status is bad. The status of the signal may be detected by a special Test Status function block such as block 30 of FIG. 2. Block 30 analyzes the signal at its input and sets the output to "True" if the input status is bad. The Boolean output of block 30 can be used to initiate the desired response when bad status is detected.

The definition of what is considered to be bad status depends on the situation. For example, a signal produced during startup should probably be considered to be valid inside the DCS. That signal, however, should probably not be sent to the field as a control output.

Because the meaning of bad status varies from situation to situation, block 30 includes a status mask which determines which status bits make the signal bad. The default mask consists of the HardErr, SoftErr and ComErr bits. The default mask can be changed on a systemwide, or block by block, basis.

The status information can also be used by the system operator. For example, status information can be used in the man machine interface to allow the operator to better assess the integrity of the value being displayed.

It may be desirable to force a signal to have a certain status. One example of where that may occur is if the control logic uses a data validation algorithm on the inputs and determines that an input was faulty. In this instance it would be desirable to force the signal at the output to have a bad status.

The forcing of a signal to have a certain status can be performed by a Force Status function block (not shown). This block sets the status of its output signal to a desired state. The value of the output signal is the same as the value of the input signal to the block. The function block may include various options which determine if the block propagates or ignores the status of the input signal and whether the block acts to force bits in the status state to be a zero or a one.

Referring now to FIG. 3, there is shown a block diagram of an application which includes a closed loop and may therefore lead to the latching of a bad status. Block 32 has two input signals each of which has an associated status. The two input signals to the block 32 are designated in FIG. 3 as input__1 and input__2. If block 32 propagates the status of those signals then if the input__1 signal has a bad status that status will in accordance with the above rules appear at the output of block 32 even if the status of the input__2 signal is good. If that bad status is also propagated through block 34 it will by the closed loop appear as the status of the input__2 signal to block 32. Once the status of input__2 signal becomes bad as a result of the bad status of input__1 signal, that bad status is locked in the closed loop and continues to propagate forever. Therefore, even if the status of input__1 should thereafter change to good, the closed loop of FIG. 3 will always have a bad status.

To prevent the latching described above of the closed loop, the rules embedded in the function blocks of the present invention allow the user to block status propagation.

The user should as part of configuring the system in which the closed loop of FIG. 3 is used block status propagation at input_2 of block 32 to prevent latching of the closed loop. In this embodiment the blocking of status propagation by the user forces all of the status bits to zero.

From the above description it should be appreciated that the rules of the present invention are flexible rather than being rigid. This gives the user the opportunity to customize the rules to the requirements of the particular process in which the system is being used.

The embodiment described above represents status as a 32 bit word. Other embodiments of the present invention represent status in other ways.

In one such other embodiment of the present invention status is represented as an enumerated set of status values, for example bad, suspect, and good. The values are ranked from best (good) to worst (bad). The rules for combining enumerated status are the same as the embodiment described above, except that function blocks will propagate enumerated status to the outputs by using the worst of the input statuses. For example, if the function block multiplies two signals, one having good status and the other having suspect status, the product will have a suspect status.

In an another such embodiment of the present invention status is represented as a floating point number between 0.0 (worst) and 1.0 (best). The rules for combining this status type are the same as for the first described embodiment, except that function blocks will propagate floating point status to the outputs by using the worst of the input statuses. For example, if the function block multiplies two signals, one having a 0.3 status value and the other having a 0.95 status value, the product will have a 0.3 status value.

It should be appreciated that the rules described herein are resident in the function blocks in the form of software. It should also be appreciated that in all embodiments of the present invention the rules have the flexibility described above for the first embodiment. It should further be appreciated that the foregoing descriptions of the various embodiments for the rules should be more than adequate to allow those skilled in the art to encode the rules.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A distributed control system comprising:
    a) at least two sampled data signals each having a status included therewith, each of said included statuses having a predetermined number of bits; and
    b) at least one function block responsive to said at least two sampled data signals, said at least one function block having one or more rules included therein; said one or more rules providing for propagation of said at least two included statuses through said function block in accordance with a bitwise OR of some of said predetermined number of bits of each of said included statuses to thereby give rise to a propagated status.

2. The system of claim 1 further comprising another function block for testing said propagated status in order to determine if the same is bad.

3. The system of claim 2 further comprising another function block for forcing said tested propagated status to have a certain status.

4. A distributed control system comprising:
    a) at least two sampled data signals each having a status included therewith, each of said included statuses having a predetermined range of values representing status from good to bad; and
    b) at least one function block responsive to said at least two sampled data signals, said at least one function block having one or more rules included therein; said one or more rules included in said at least one function block providing for propagation of said at least two included statuses through said function block in accordance with selecting the worst of said range of values from said included statuses for status propagation through said function block.

5. The system of claim 4 further comprising another function block for testing said propagated status in order to determine if the same is bad.

6. The system of claim 5 further comprising another function block for forcing said tested propagated status to have a certain status.

\* \* \* \* \*